Patented Oct. 18, 1938

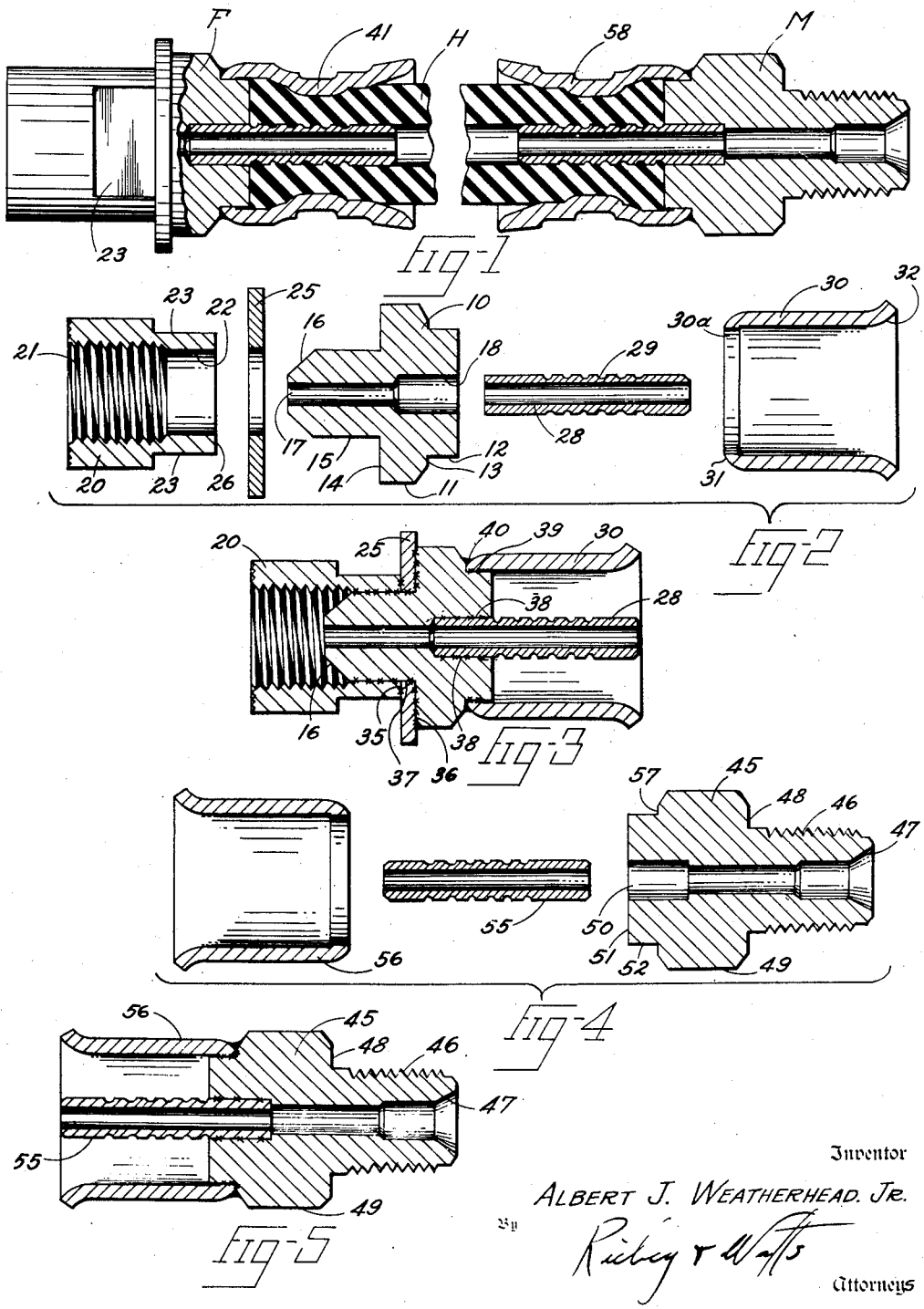

2,133,313

UNITED STATES PATENT OFFICE 2,133,313

HOSE COUPLING AND METHOD OF MAKING SAME

Albert J. Weatherhead, Jr., Cleveland, Ohio, assignor to The Weatherhead Company, Cleveland, Ohio, a corporation of Ohio Application December 9, 1935, Serial No. 53,471

5 Claims. (Cl. 29—157)

This invention relates to fittings or couplings for hose ends and to methods of making the same, and more particularly the invention relates to fittings or couplings for the fluid lines of hydraulic brakes for automobiles.

The fluid lines of hydraulic vehicle brakes require flexible hose connections between the metal tubing system carried by the frame of the vehicle and the brake actuating cylinders mounted adjacent the vehicle wheels on unsprung parts of the vehicle. The fluid lines and hose fittings may be subjected to extremely high pressures, sometimes reaching 1600 pounds per square inch, and in addition the hose fittings must withstand mechanical stresses set up by the relative movement between the sprung and unsprung parts of the vehicle and must withstand the vibration and jarring which constantly take place as the vehicle is operated. The fittings themselves and the joints between the fittings and the hoses must be leak proof and must be extremely reliable because in the ordinary hydraulic brake system the failure of a single part in the fluid system will result in the failure of the entire braking system.

It is therefore among the objects of my invention to produce fittings adapted for connection to hose ends which are extremely strong and reliable and which can withstand the severe conditions of service which are encountered in the hydraulic brake systems of modern motor cars. Another object of my invention is to provide a method of making such fittings rapidly and economically. Another object of my invention is to provide a method of making fittings whereby the various component parts of the fittings can be made of materials best suited for such parts, and the parts permanently joined together into a unitary fitting having great strength and durability. Another object of my invention is to provide a method of making fittings or other articles of steel or other ferrous material wherein different characteristics of hardness and strength can be obtained in different parts of the finished article by subjecting the entire article to the same heat treatment. Another object of my invention is to provide a fitting wherein the parts making up the fitting can be produced by economical operations such as automatic screw machine operations or punch press operations.

Further objects and advantages of my invention will become apparent from the following description of preferred forms thereof as applied to fittings for hydraulic brake hoses. The essential characteristics are summarized in the claims.

In the drawing—Figure 1 illustrates a longitudinal section through a brake hose having my fittings attached to the ends thereof; Figure 2 is a sectional view, showing the component parts making up the fitting illustrated on the left hand end of Figure 1; Figure 3 is a view of the parts shown in Figure 2 assembled together but before the fitting is attached to the hose; Figure 4 illustrates the parts comprising the fitting on the right hand end of the hose shown in Figure 1; and Figure 5 is a sectional view of this fitting with the parts assembled but before it has been secured to the hose end.

As illustrated in Figure 1, a hose assembly made according to my invention may comprise a flexible hose H having secured at one end thereof a female fitting or coupling F, and at the other end thereof a male coupling or fitting M. The external appearance of these fittings is generally similar to the hose end fittings disclosed in my prior Patent No. 2,008,650, and in my application Serial No. 26,932, filed June 17, 1935. As described in my said prior patent and application, the female fitting F is adapted to be connected to a metal tube mounted in the frame of the vehicle and also to be secured to the vehicle frame. The male fitting M is adapted to be screwed directly into a hydraulic brake cylinder, or to be screwed into a special fitting. These features as well as other uses of the completed fittings are described in detail in my prior patent and application and claimed therein and will not be described further in this application.

In order to make it possible to manufacture my fittings rapidly and economically from steel or other ferrous material, I preferably make the fittings by building up the several parts and assembling the fittings by copper brazing the parts together in a reducing atmosphere or by otherwise permanently welding the parts together to form a strong unitary assembly.

The parts of the fitting F are illustrated in detail in Figure 2 of the drawing in which it will be seen that the fitting comprises a body portion 10 having hexagonal wrench engaging surfaces 11, a cylindrical surface 12 projecting from one side of the hexagonal portion and a radial surface 13 disposed between the hexagonal portion and the cylindrical surface 12. On the other side of the hexagonal body portion there is an annular face 14 and a cylindrical portion 15 of reduced diameter terminating in a conical seat 16. A bore 17 extends through the fitting from the conical seat and terminates at its other end in an enlarged portion 18.

To provide a coupling of the type described in my prior Patent No. 1,733,925 for connection with a metallic tube, I preferably employ a cylindrical sleeve 20 having an internally threaded portion 21 and a cylindrical portion 22 which is adapted to be sleeved over the cylindrical portion 15 of the body 10 making a light press fit therewith. The external surfaces of the sleeve portion are cylindrical with the exception of the oppositely disposed parallel flats 23 which are adapted to receive a securing clip of the type disclosed in the Baldwin Patent No. 1,875,209, issued August 30, 1932. It will be apparent that the sleeve can be made rapidly and economically from round bar stock by automatic screw machine operations, and because round bar stock can be employed no external machining of the sleeve is required except for the formation of the flat portions 23. Furthermore, round bar stock is an additional economy in that it costs less per pound than the hexagonal bar stock which would be required if the body 10 and sleeve 20 were formed integrally in accordance with prior practices.

A bearing surface for the frame member or other member to which the fitting may be secured may be provided by an annular washer 25 mounted on the cylindrical portion 15 of the body between the end face 26 of the sleeve 20 and the annular surface 14 of the body portion. Washers of this type may be produced very economically by stamping from low carbon steel.

To provide means for securing the hose to the body portion preferably in the manner described and claimed in my Patent No. 2,000,680, issued May 7, 1935, I have provided a nipple 28 which is adapted to be pressed into the enlarged portion 18 of the bore 17 and a sleeve 30 which is adapted to be pressed onto the cylindrical surface 12 of the body portion with its end surface 31 in engagement with the annular surface 13 of the body portion. The sleeve and nipple together form an annular chamber which is adapted to receive the end of the flexible hose to be connected thereto, and the assembled fitting may be secured to a flexible hose by rolling in the sleeve as at 41 to clamp the hose between the nipple and sleeve and compress the material of the hose against the end wall of the body portion.

It will be evident that by forming these parts separately, rather than integrally with the body portion, a great deal of machining can be eliminated and the parts can be produced very economically from the most suitable materials. Thus the nipple 28 can be made of inexpensive steel tubing with the corrugations 29 rolled therein, while the sleeve 30 is preferably formed by drawing operations carried out on punch presses. Heretofore, body and sleeve were required to be formed of the same stock, thus making necessary the use of a steel which was not best suited for either the machining operations or the rolling-in operation, but which had to be selected with both properties in mind. By my present invention, it is possible to produce the body portion 10 and the internally threaded sleeve portion 22 of free machining stock such as high sulphur Bessemer steel, so that these parts can be turned out rapidly and economically by automatic screw machine operations, while the sleeve 30 may be drawn out of low carbon deep drawing stock which is ideally suited to the rolling-in operation necessary to assemble the hose and fitting. Preferably the sleeve is formed by first drawing a cup, and then punching out the end of the cup as at 30a. If desired the opposite end of the cup may be flared, as at 32 during the drawing operation.

Thus the component parts making up my fitting can be manufactured at minimum expense and the parts are so designed that the assembly can likewise be carried out at extremely low cost by a copper brazing operation. In order to carry out this operation, the various parts are preferably copper plated, then assembled in the form illustrated in Figure 3 of the drawing and placed in a furnace having a reducing atmosphere of hydrogen or other suitable gas and heated to a temperature of approximately 2250° F. At this temperature and in the proper atmosphere, the copper forms an alloy with the underlying ferrous material and forms an alloy bond between the contacting surfaces of the various parts which is substantially as strong as the original parts themselves. This operation also produces a corrosion resisting alloy coating on all of the exposed surfaces of the parts, and the brazing can be carried out so that the parts come out of the furnace bright and clean.

It will be noted that the joints that are under stress in my fitting have ample area to withstand any forces which may be applied to them. Thus the sleeve 20 is welded to the body portion along the cylindrical contacting surfaces 15 and 22 as indicated in Figure 3. This weld is subjected only to shear when a metal tube is clamped in the fitting. The joint is further strengthened by the weld between the annular surface 26 and the face of the washer 25 as indicated at 35, the washer in turn being welded to the annular surface 14 as indicated at 36 and to the cylindrical surface 15 as indicated at 37. The nipple is welded within the enlarged bore 18 as indicated at 38, thus precluding any possibility of leakage between the nipple and the body of the coupling 10, while the sleeve 30 is welded to the cylindrical surface 12 as indicated at 39, additional strength being gained by the weld between the end 31 of the sleeve and the annular surface 13, a fillet of copper or copper steel alloy ordinarily being formed as indicated at 40. Thus the finished fitting is a strong unitary structure which is ideally suited to the rolling-in operation whereby the sleeve 30 is deformed as at 41 to secure the hose to the coupling.

If desired, additional copper may be supplied to the interior of the fitting adjacent the conical end portion 16 so that threads 21 opposite the conical portion 16 become filleted with copper or copper alloy in the manner disclosed in the application of Henry D. Stecher Serial No. 3705, filed January 28, 1935, to produce an additional support for the nut employed to clamp the flared end of the tube against the conical seat.

In Figure 4 of the drawing, I have illustrated the parts comprising the male end of the fitting. These parts are in general similar to the parts heretofore described except for the formation of the conical seat, and preferably comprise a body portion 45 having an externally threaded portion 46 of reduced diameter terminating in a beveled conical seat portion 47 for connection to a special fitting and having an annular seat portion 48 between the hexagonal portion 49 and the threaded portion 46 for forming a joint directly with the cylinder of a hydraulic brake.

The other end of the body portion is provided with an enlarged bore 50, an annular face 51, and a cylindrical surface 52. A nipple 55 which may be substantially identical with the nipple 28 previously described is adapted to be inserted within the bore 50, and a sleeve 56 substantially identical with sleeve 30, previously described, fits over the cylindrical portion 52 and against the annular surface 57 of the body portion. These parts are copper plated or otherwise supplied with copper and then assembled as indicated in Figure 5 and subjected to the copper brazing operation heretofore described. It will be noted that the body portion 45 may be made rapidly from free machining stock such as high sulphur Bessemer steel by automatic screw machine operations, while the nipple 55 and sleeve 56 may be formed from steel tubing and drawn from deep drawing stock as described in conjunction with the nipple 28 and sleeve 30. The assembled fitting, after the parts have been brazed, may be secured to the end of a hose by the method disclosed in my Patent No. 2,000,680 by rolling in the sleeve as indicated at 58 in Figure 1 securely to clamp the hose between the sleeve and nipple and to compress the material of the hose against the radial end face of the body portion 45.

A further important advantage in my method of making fittings by separately forming the parts and then assembling them by a brazing operation results from the heat treatment effected in the brazing operation and in the possibility of employing steels which will react differently to the same heat treatment so as to produce different physical characteristics in different parts of the fitting.

Thus in the preferred forms of fittings as described herein, the sleeves which are subsequently deformed in the rolling in operation are made of very low carbon deep drawing stock. This material is hardened by the drawing operation used to produce the sleeves, but the subsequent heating during the brazing operation results in the removal of all of the hardness imparted to the steel by the drawing operation and leaves the sleeve in ideal condition for the rolling in operation.

Of course the heat of the brazing furnace also will completely anneal the high sulphur free machining stock from which I preferably make the body portions of my coupling. However, if desired, the body portions if made of suitable material can be hardened either by quenching the brazed couplings after they have come from the brazing furnace and have been cooled to the proper quenching temperature or by subsequent reheating the couplings and then quenching them.

By proper selection of steels the hardening operation can be carried out in a manner selectively to harden the various parts. Thus by employing the steels described herein, the body of the coupling can be hardened without hardening the sleeve even though the sleeve is given precisely the same treatment as the body, for the low carbon steel from which the sleeves are preferably made can not be materially hardened by heat treatment. It will be evident therefore that if desired the couplings can be given a heat treatment which will result in the production of couplings having hard and strong body portions without impairing the qualities of the sleeve which are necessary to carry out the rolling in operation in the most advantageous manner.

Those skilled in the art will appreciate that this feature of my method can be applied to other types of fittings and to other uses wherein it is desired to obtain different characteristics in articles or devices made up from a plurality of steel parts permanently joined together as by copper brazing.

From the foregoing description of preferred forms of my invention, it will be seen that I have provided hose couplings composed of parts which can be manufactured economically and rapidly from inexpensive materials by inexpensive machining and punch press operations. The parts can be easily assembled and the assembled fittings have great strength by reason of the design of the fittings which insures ample strength in the welded joints. Because the internal nipple is welded into the body portion of the fitting while the external sleeve is permanently joined to the body portion of the fitting, it is possible to make strong mechanical and permanently leak proof joints between hose ends and fitting.

My fittings can be adapted to a wide variety of uses and my manufacturing methods can be adapted to the production of various different types of fittings and other similar articles. It is therefore to be understood that my patent is not limited by the foregoing description of preferred forms of my invention, or in any manner other than by the scope of the appended claims when given the range of equivalents to which my patent may be entitled.

I claim:

1. A hose coupling comprising a body portion having a hexagonal outer surface, a central passageway terminating in a conical seat portion, a cylindrical surface adjacent said hexagonal surface portion, another cylindrical surface of reduced diameter adjacent said conical seat portion, a deformable sleeve engaging said first named outer cylindrical surface, a washer surrounding said cylindrical surface of reduced diameter and disposed adjacent said hexagonal surface, a hollow threaded member surrounding said conical seat portion and engaging said cylindrical surface of reduced diameter, and a tubular nipple having an end disposed within the said central passageway and extending outwardly within said sleeve, said body portion, sleeve, washer, hollow member and nipple all being permanently joined together throughout substantially their entire contacting areas by an alloy bond.

2. A method of making couplings or fittings including the steps of forming a body portion from ferrous material which is capable of being hardened by heat treatment, forming a sleeve from low carbon ferrous material which cannot be substantially hardened by heat treatment, permanently joining said sleeve to said body portion by copper brazing in a furnace having a controlled atmosphere, thereby annealing said sleeve and said body portion, and subjecting the assembled fitting to heat treatment and hardening the body portion without substantially hardening the sleeve portion.

3. A method of making hose couplings or fittings including the steps of forming a body portion having a central passageway and a cylindrical surface from hexagonal bar stock, forming a sleeve by drawing a cup from sheet material which normally hardens during the drawing operation and punching out the bottom of the cup, assembling the sleeve with the punched out end portion thereof in engagement with the cylindrical annular surface of the body portion and permanently copper brazing the sleeve to the body portion in a manner whereby the previously hardened sleeve becomes annealed by the temperatures effecting said copper brazing.

4. A method of making hose couplings or fittings including the steps of forming a body portion having a central passageway and a cylindrical surface from hexagonal free machining ferrous bar stock, forming a sleeve by drawing a cup from deep drawing ferrous material which normally hardens during the drawing operation, punching out the bottom of the cup, assembling the sleeve with the punched out end portion thereof in engagement with the cylindrical annular surface of the body portion and permanently copper brazing the sleeve to the body portion under temperature conditions such that the sleeve is annealed during the brazing operation.

5. A method of making hose couplings or fittings including the steps of forming a body portion having a central passageway and an exterior cylindrical surface, forming a sleeve by drawing a cup from sheet material which normally hardens during the drawing operation and punching out the bottom of the cup, assembling the sleeve with the punched out end portion thereof in engagement with the cylindrical annular surface of the body portion and permanently copper brazing the sleeve to the body portion in a manner whereby the previously hardened sleeve becomes annealed by the temperatures effecting said copper brazing.

ALBERT J. WEATHERHEAD, Jr.